US006195861B1

(12) United States Patent
Frye et al.

(10) Patent No.: US 6,195,861 B1
(45) Date of Patent: Mar. 6, 2001

(54) APPARATUS FOR INSTALLING FLASHOVER PROTECTION COVERS

(75) Inventors: Terry Edward Frye, Cary, NC (US); Donald C. Barrett, Marlborough (GB)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/519,379

(22) Filed: Mar. 3, 2000

Related U.S. Application Data

(63) Continuation-in-part of application No. 09/212,096, filed on Dec. 15, 1998, now Pat. No. 6,094,792.

(51) Int. Cl.[7] .................................................. B23P 19/02
(52) U.S. Cl. ............................ 29/33 R; 29/235; 174/5 R; 254/134.3 R
(58) Field of Search ................................ 29/33 R, 33 K, 29/235, 233, 758, 278, 759, 564.6; 174/5 R; 254/134.3 R; 81/53.1

(56) References Cited

U.S. PATENT DOCUMENTS

| 3,840,716 | * | 10/1974 | Sommerman et al. | .......... 174/140 R |
| 4,267,628 | | 5/1981 | Izraeli | ..................................... 29/235 |
| 4,280,013 | | 7/1981 | Clutter | ................................. 174/5 R |
| 4,454,999 | | 6/1984 | Woodruff | ..................... 154/234.3 FP |
| 4,965,930 | | 10/1990 | Wnukowski | ............................ 29/758 |
| 5,794,495 | | 8/1998 | Anderson | ............................ 29/235 X |
| 6,020,560 | * | 2/2000 | Kamel et al. | ..................... 174/138 R |

FOREIGN PATENT DOCUMENTS

| 502410 | 6/1930 | (DE) . |
| 842240 | 7/1960 | (GB) . |
| 8-182135 | 11/1996 | (JP) . |

* cited by examiner

*Primary Examiner*—William Briggs
(74) *Attorney, Agent, or Firm*—Myers Bigel Sibley & Sajovec

(57) ABSTRACT

A cover installation apparatus installs continuous lengths of flashover protection covers around energized electrical power lines. The apparatus includes a cover assembly housing that takes a flat, extruded length of material and forms the material into a closed circular shape surrounding a power line. The cover assembly housing includes opposite first and second ends, with an inlet port in the first end and an outlet port in the second end. An interior passageway extends along a longitudinal direction from the inlet port to the outlet port and is configured to receive the power line therethrough. The interior passageway also provides a path for the flexible panel to follow from an uninstalled configuration to an installed configuration surrounding the power line.

12 Claims, 12 Drawing Sheets

APPARATUS FOR INSTALLING FLASHOVER PROTECTION COVERS

RELATED APPLICATION

This application is a continuation-in-part of U.S. patent application Ser. No. 09/212,096, filed on Dec. 15, 1998, U.S. Pat. No. 6,094,792, which is hereby incorporated herein in its entirety by reference.

FIELD OF THE INVENTION

The present invention relates generally to insulating covers and, more particularly, to devices for installing insulating covers.

BACKGROUND OF THE INVENTION

Electrical power may be transmitted from a generation source to consumers via overhead conductors (hereinafter "power lines") strung between towers or poles. Electrical power is conventionally transmitted in phases wherein multiple power lines are utilized. One or more of these power lines may be a "hot" power line that carries a specified amount of alternating current electric power. Flashover may result if contact is made between two hot power lines or between a hot power line and ground. Non-grounded contact with a hot power line, such as when a bird sits upon a hot power line, typically does not result in flashover.

Because uninsulated power lines are typically less expensive than insulated power lines, many electric power suppliers utilize uninsulated power lines for the transmission and distribution of electric power. With often hundreds of miles of power lines, the use of uninsulated power lines can result in large cost savings to electric power suppliers.

Although uninsulated power lines may be less expensive to install than insulated power lines, potentially costly problems may arise from the use of uninsulated power lines. Adequate clearances between power lines and/or other grounded objects may not be sustainable during adverse weather conditions (i.e., storms and high winds). As a result, the potential for flashover caused by uninsulated power lines contacting each other or other objects may be increased. Another source of flashover may be caused by large birds and animals which have sufficient size to make contact with a hot power line and a grounded object or another power line. In addition, falling trees and tree branches may cause contact between hot power lines and ground which may result in flashover.

Flashover may result in a power outage which is undesirable to electric power suppliers and to consumers. For existing power transmission and distribution systems, electric power suppliers may find it desirable to replace uninsulated power lines with insulated ones in order to reduce the likelihood of flashover. Unfortunately, the cost of replacing uninsulated power lines with insulated power lines may be expensive. Furthermore, an interruption in the delivery of power may be required to replace uninsulated power lines. This may be economically disadvantageous to an electric power supplier as well as being undesirable to electric power consumers.

Insulating covers for use in protecting workers from hot, uninsulated power lines are available. Unfortunately, these insulating covers may be bulky and somewhat difficult to install on spans between supporting towers or poles. Indeed, a power line span between supporting towers or poles may exceed hundreds of meters. In addition, manually installing protective covers on long spans of power lines may be somewhat labor intensive and expensive. Installation may involve inserting a power line within a cover and then manually securing edge portions of the cover together to enclose the power line. Furthermore, installing protective covers on long spans of energized power lines may be somewhat hazardous to persons installing the covers. To reduce the threat of electrical shock, it may be desirable to remove a power line from service in order to cover the power line. Unfortunately, interruptions in the delivery of power may be economically disadvantageous to an electric power supplier as well as being undesirable to electric power consumers.

SUMMARY OF THE INVENTION

It is, therefore, an object of the present invention to provide a device that can quickly install flashover protection covers on long spans of energized power lines without requiring the power lines to be removed from service during installation.

It is another object of the present invention to provide a device for installing protective covers around energized electric power lines that reduces the potential for electrical shock to installation personnel.

These and other objects of the present invention are provided by an apparatus that installs flashover protection covers around energized electrical power lines, wherein each cover includes an elongated flexible panel having generally parallel opposite edge portions configured to be joined together. The cover installation apparatus is configured to be easily secured to a hot power line by a user, either from the ground or from a bucket, without requiring the power line to be removed from service. The cover installation apparatus may be secured to the end of a manipulator device, such as a "hot stick", and is configured for easy operation by a user.

The cover installation apparatus includes a frame having a cover assembly housing secured thereto. The cover assembly housing receives a flat, flexible panel and forms the flexible panel into a closed circular shape surrounding a power line. The cover assembly housing includes opposite first and second ends, with an inlet port in the first end and an outlet port in the second end. An interior passageway extends along a longitudinal direction from the inlet port to the outlet port and is configured to receive the power line therethrough. The interior passageway also provides a path for the flexible panel to follow from an uninstalled configuration to an installed configuration surrounding the power line.

The inlet port has a shape complimentary to a cross section of the flexible panel in an uninstalled configuration. The outlet port has a shape complimentary to a cross section of the flexible panel in an installed configuration. The passageway has a shape configured to join together the opposite edge portions of the flexible panel as the flexible panel is advanced through the passageway from the inlet port to the outlet port such that the flexible panel forms a longitudinally extending cover surrounding the electrical power line.

An alignment drum is rotationally secured to the frame upstream from the inlet port and serves as means for aligning the flexible panel with the inlet port as the flexible panel is advanced through the passageway. A guide rail is secured to the frame and extends from the alignment drum to the inlet port along the longitudinal direction defined by a power line to be covered. The guide rail is configured to slidably receive the flexible panel from the alignment drum and to direct the flexible panel into the inlet port of the cover assembly housing. The alignment drum is also configured to receive, from a supply source, the flexible panel at an angle transverse to the longitudinal direction and to direct the flexible panel onto the guide rail.

A first drive roller is rotationally mounted to the frame upstream from the inlet port and serves as means for advancing the flexible panel into and through the passageway. The first roller is configured to frictionally engage the flexible panel and advance the flexible panel along a guide rail into the inlet port. A second drive roller is rotationally mounted to the frame downstream from the outlet port. The second roller is configured to frictionally engage the cover exiting from the outlet port and advance the assembled cover along the electrical power line. A cutting device is preferably provided upstream from the inlet port and is configured for easy manipulation by a user.

According to another embodiment of the present invention, an apparatus for installing a cover around an electrical power line, includes a cover assembly housing and guide assembly. The guide assembly includes an elongated bottom wall having opposite ends. A pair of spaced-apart, elongated side walls extend upwardly from the bottom wall. The side walls converge towards one end of the bottom wall to define a guide assembly outlet and diverge towards the opposite end of the bottom wall to define a guide assembly inlet.

The guide assembly includes a partition that aligns the various portions of a flexible panel passing through the guide assembly during installation of a cover. According to one embodiment of the present invention, the partition includes a base member that extends upwardly from the bottom wall between the elongated side walls. An elongated top portion is transversely connected to the base member so as to be maintained in spaced-apart relationship with the bottom wall. The guide assembly defines a pair of spaced-apart, converging passageways that are configured to slidably receive the elongated edge portions of a flexible panel therethrough. The converging passageways force together the opposite edge portions of a flexible panel being advanced through the guide assembly.

The present invention is advantageous because flashover protection covers can be installed on long spans of energized power lines safely and quickly. Furthermore, flashover protection covers can be installed on power lines without requiring the power lines to be removed from service.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Flashover Protection Covers

Figure 1:
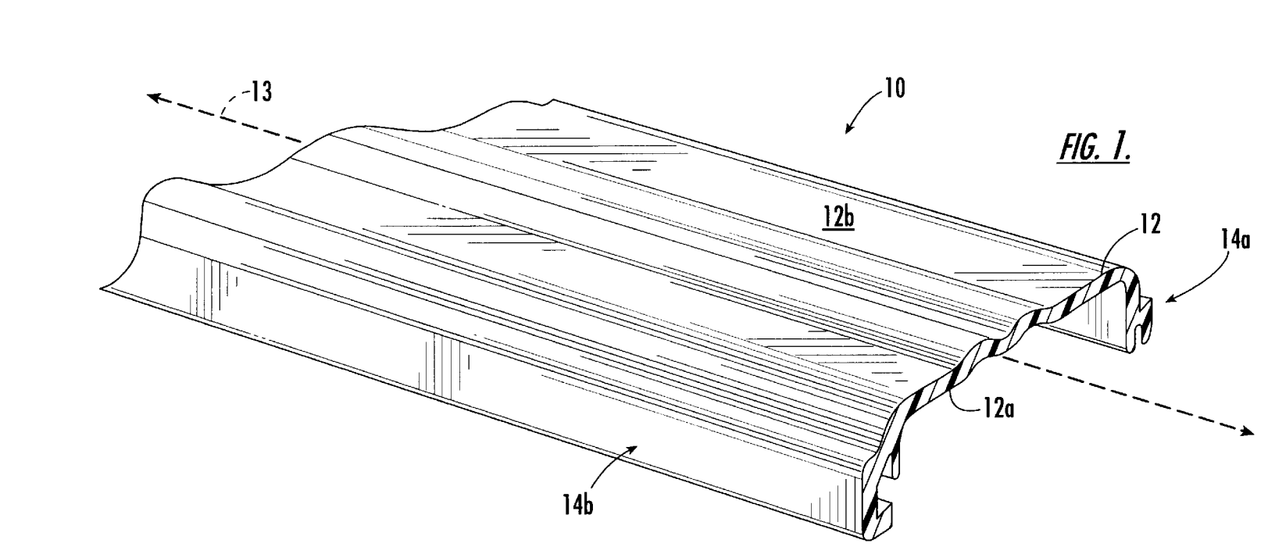
FIG. 1 is a partial perspective view of an uninstalled flashover protection cover for an electric power line.

Referring now to FIG. 1, an exemplary flashover protection cover 10 for covering an electric power line is illustrated in an uninstalled configuration. The flashover protection cover 10 includes an elongated flexible panel 12 that defines a longitudinal direction (indicated by arrow 13). The flashover protection cover 10 has opposite first and second faces 12a, 12b, and generally parallel, opposite first and second edge portions 14a, 14b, as illustrated. The first and second edge portions 14a, 14b are configured to be joined together such that the first face 12a forms a longitudinally extending chamber 16 (FIG. 3C) configured to enclose an electrical power line 30 extending along the longitudinal direction 13. The second face 12b forms an outer surface of the flashover protection cover 10.

Figure 2:
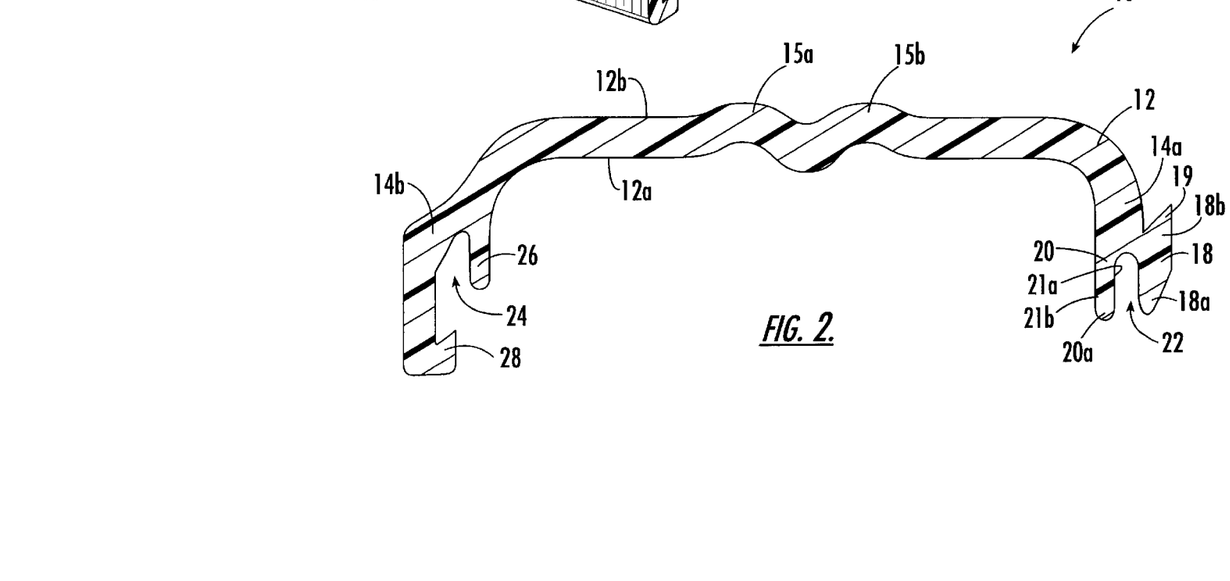
FIG. 2 is an end view of the flashover protection cover of FIG. 1.

Referring to FIG. 2, the flashover protection cover 10 includes a pair of longitudinally extending "hinges" 15a, 15b formed within the elongated panel 12, as illustrated. The hinges 15a, 15b provide the flashover protection cover 10 with additional flexibility that facilitates closing the elongated panel 12 around a power line. The hinges 15a, 15b also help reduce material failures, such as cracking, caused by thinning of the material along the elongated panel during closing procedures.

Still referring to FIG. 2, the first edge portion 14a comprises a first male member 18, a wall or creepage extender 20 having a free end 20a, and a first female member 22 between the first male member 18 and the creepage extender 20, as illustrated. The first male member 18 has a leading end 18a and an opposite trailing end 18b, as illustrated. The leading end 18a has a tapered or cuneately-shaped configuration such that a cross—sectional thickness thereof decreases in a direction away from the trailing end 18b. The trailing end 18b includes a first barb 19 that extends in a direction away from the leading end 18a, as illustrated.

The second edge portion 14b includes a second female member 24 and an adjacent second male member 26, as illustrated. The second female member 24 has a shape complimentary to the first male member 18 on the first edge portion 14a. The second female member 24 includes a second barb 28 that is configured to interlock with the first barb 19 of the first male member 18 (FIG. 3C). The second male member 26 is configured to matingly engage with the first female member 22, as illustrated in FIG. 3C. The creepage extender 20 has opposite first and second faces 21a, 21b such that, when the first male member 18 and second female member 24 are matingly engaged, the creepage extender first face 21a is in adjacent contacting relation with the second male member 26 and the creepage extender second face 21b is in adjacent relationship with an electrical power line 30 extending through the chamber 16, as illustrated in FIG. 3C.

Figure 3A:
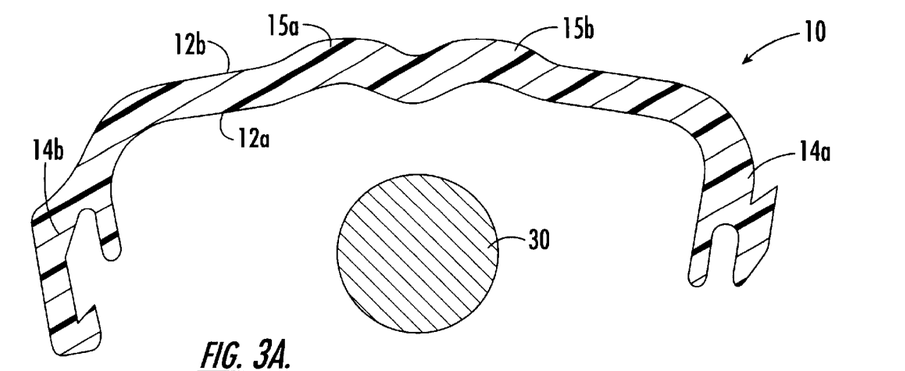
FIG. 3A is an end view of the flashover protection cover of FIG. 1 in an open position around an electric power line.
Figure 3B:
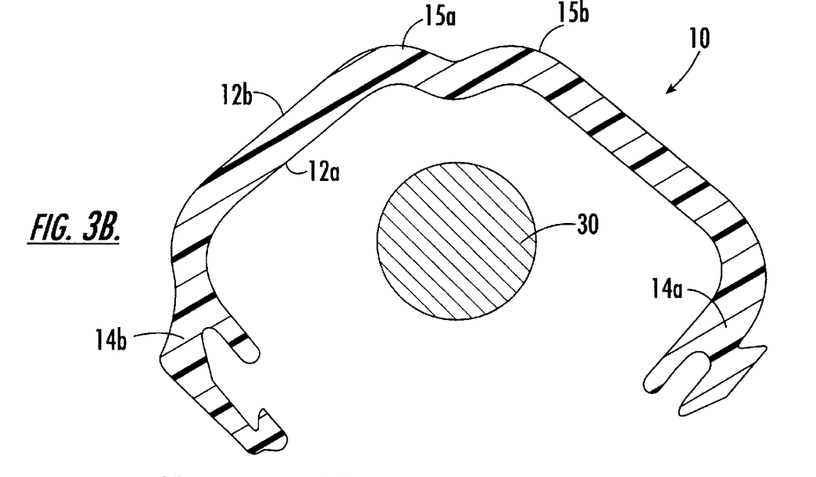
FIG. 3B is an end view of the flashover protection cover of FIG. 1 in an intermediate stage of closure around an electric power line.
Figure 3C:
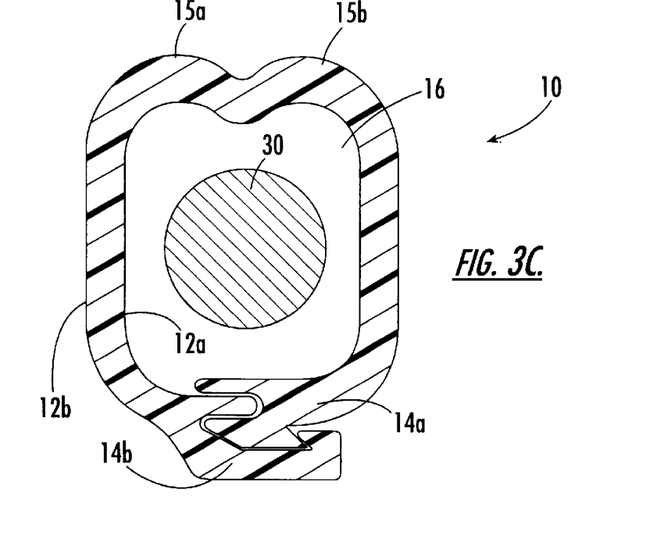
FIG. 3C is an end view of the flashover protection cover of FIG. 1 in an installed position around an electric power line.

Referring now to FIGS. 3A–3C, an end view of the flashover protection cover 10 is illustrated in various stages of closure around a power line 30. The flashover protection cover 10 bends via hinges 15a, 15b such that end portions 14a, 14b move towards each other (FIG. 3B), eventually becoming interconnected, as illustrated in FIG. 3C.

Flashover protection covers that may be installed via the present invention may have various shapes, sizes and configurations, and are not limited to the illustrated cover of FIGS. 1–3C. Flashover protection covers may be formed of polymeric materials of high dielectric strength, including, but not limited to, medium and high density polyethylene, and natural and synthetic rubber.

Flashover Protection Cover Installation Apparatus

Referring now to FIGS. 4–7, an apparatus 40, according to the present invention, for installing a flashover protection cover 10 around an energized overhead electrical power line 30, wherein the cover 10 includes an elongated flexible panel 12 having generally parallel opposite edge portions 14a, 14b configured to be joined together, is illustrated. In operation, the cover installation apparatus 40 is stationary and advances an installed cover 10 along the span of a power line 30.

Figure 4:
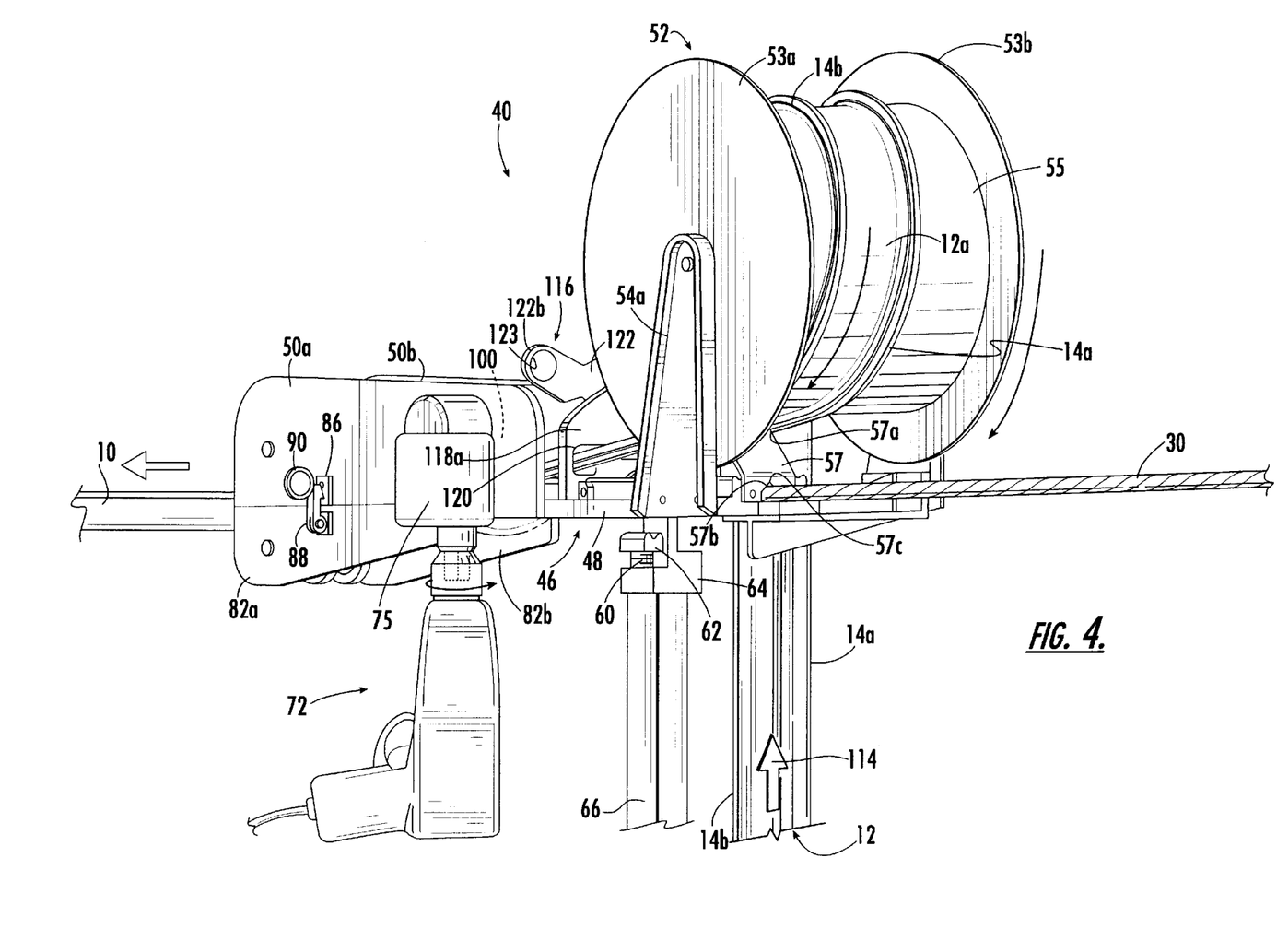
FIG. 4 is a rear perspective view of an apparatus for installing flashover protection covers around electric power lines according to the present invention.

The cover installation apparatus 40 includes a frame 46 having an elongated member 48, as illustrated. A first pair of spaced-apart, longitudinally extending flanges 50a, 50b are connected to an end 48a of the elongated member 48, and an alignment drum 52 is rotationally secured to the elongated member 48 at an opposite end 48b via support members 54a, 54b, as illustrated. A guide rail 56 extends along a top portion of the elongated member 48, as illustrated, and serves as means for guiding the flexible panel 12 into the cover assembly housing 100, which is described in detail below.

Figure 5:
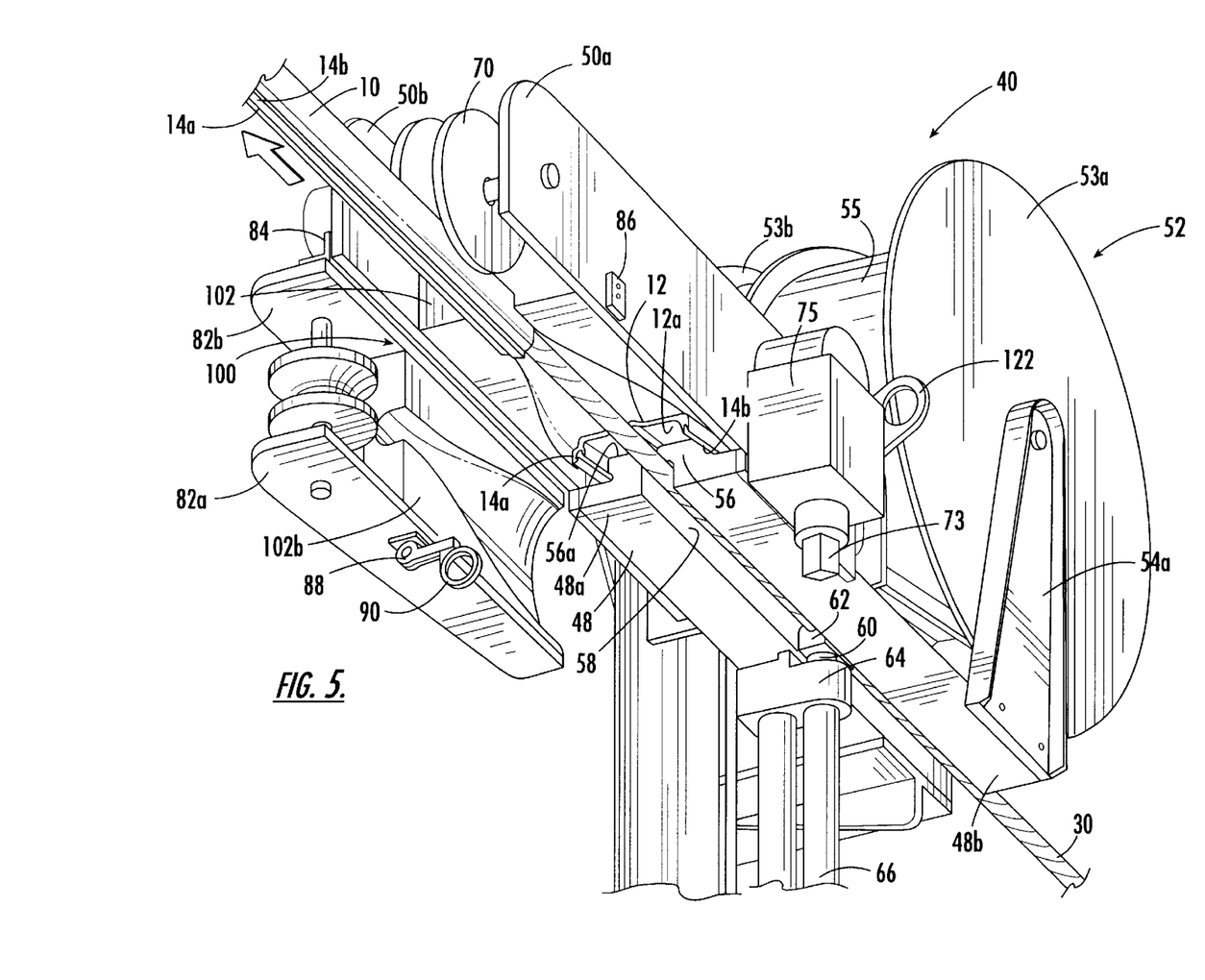
FIG. 5 is a front, upward-looking perspective view of the flashover protection cover installation apparatus of FIG. 4 illustrating the cover assembly housing in an open configuration.

A groove 58 is formed in a bottom portion of the elongated member 48 and is configured to receive a power line 30 therein, as illustrated in FIG. 5. Accordingly, when in an installed configuration, the power line 30 keeps the cover installation apparatus 40 in proper alignment thereon.

Preferably, the weight of the cover installation apparatus 40 is supported by a manipulator device 66 controlled by a user.

The cover installation apparatus 40 is preferably secured to a power line 30 extending within the groove 58 via a threaded member 60 having a head 62 configured to engage the power line 30, as illustrated. The threaded member 60 extends from the end 64 of a manipulator device 66 controlled by a user. An exemplary manipulator device is referred to as a "hot stick" in the electrical power industry. Hot sticks are manufactured by Hastings Fiber Glass Products, Inc., Hastings Mich. A bottom portion of the elongated member 48 is also secured to the end 64 of the manipulator device 66, as illustrated.

Figure 6:
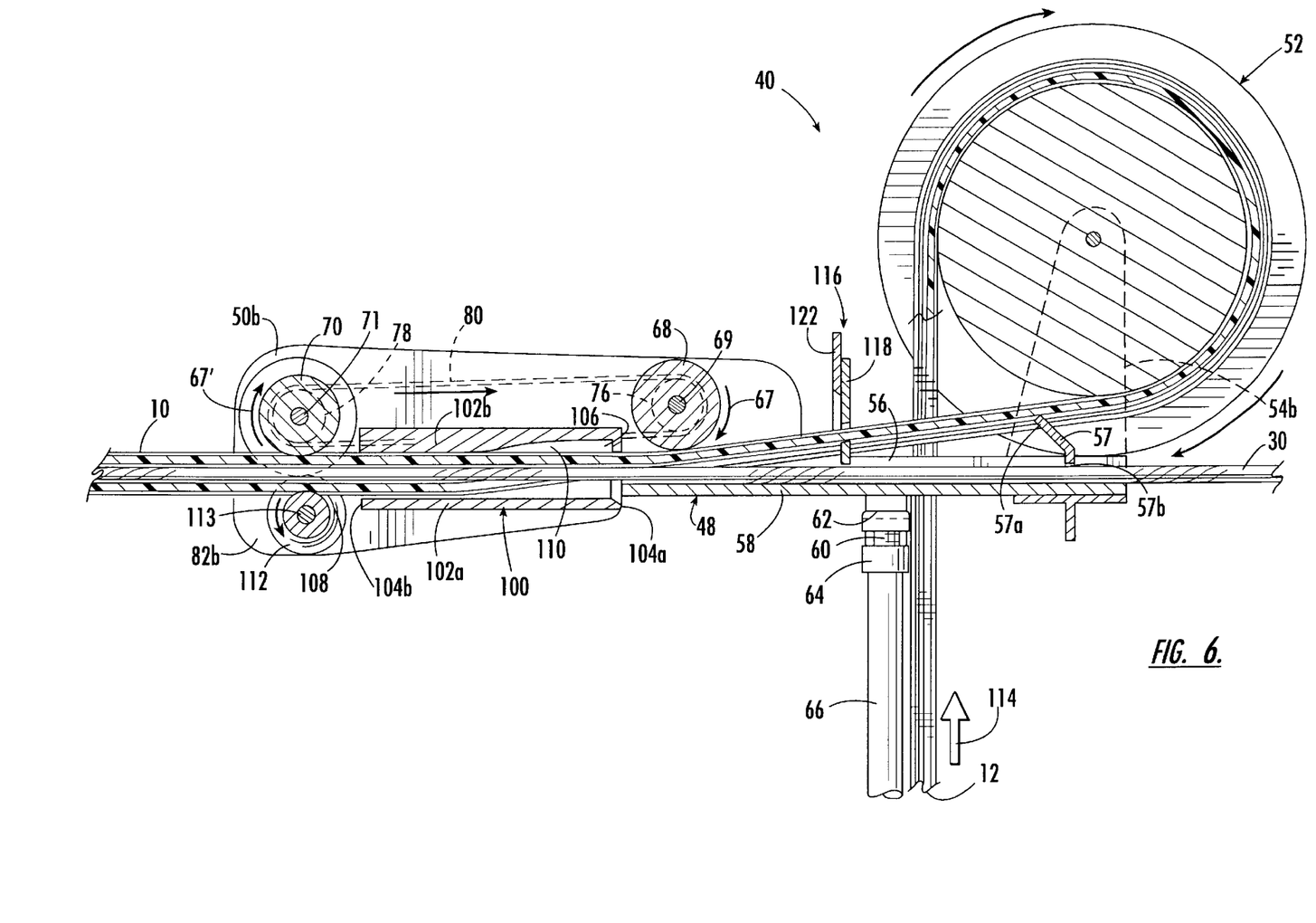
FIG. 6 is a cross sectional side view of the flashover protection cover installation apparatus of FIG. 4.
Figure 7:
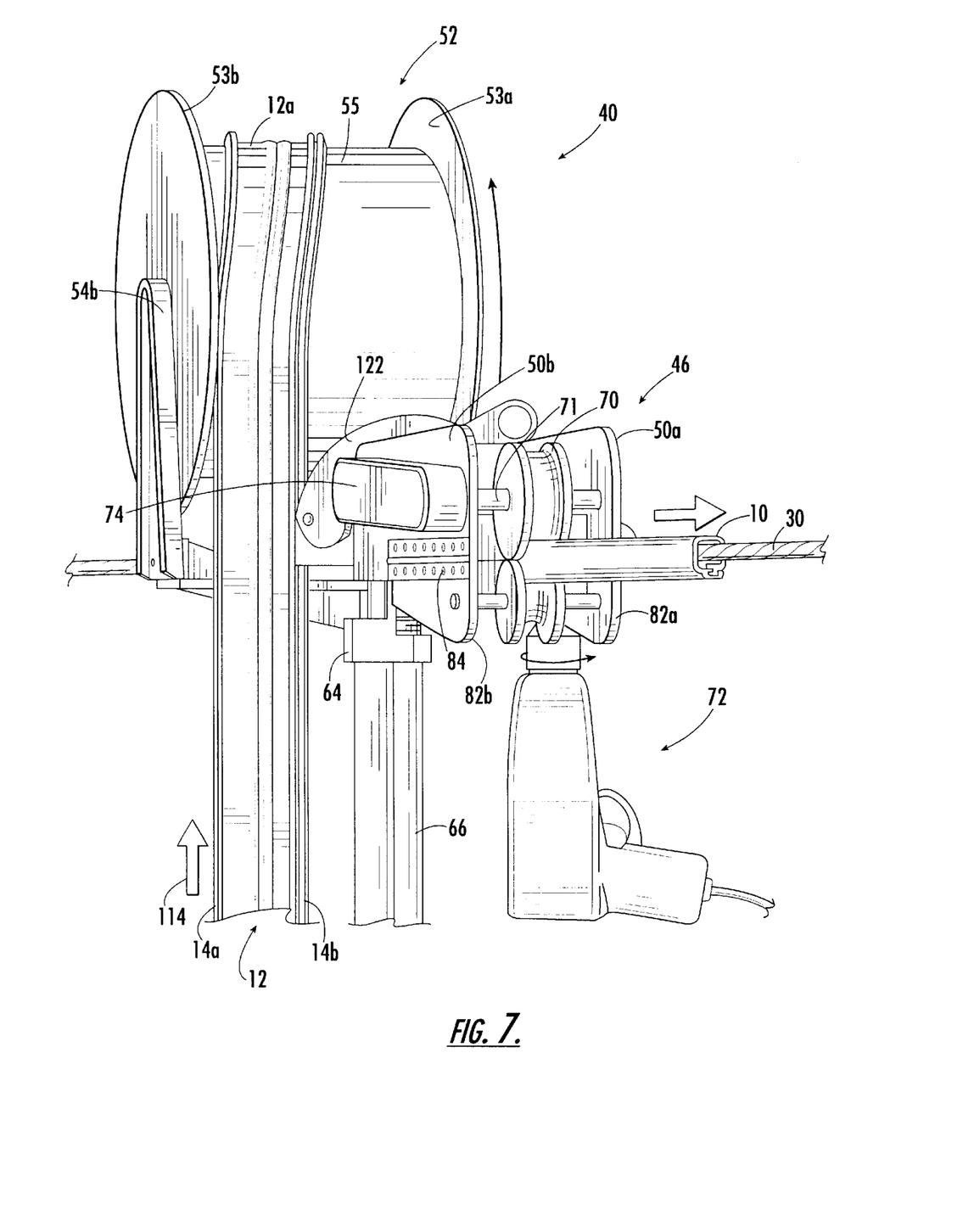
FIG. 7 is a front perspective view of the flashover protection cover installation apparatus of FIG. 4.
Figure 10:
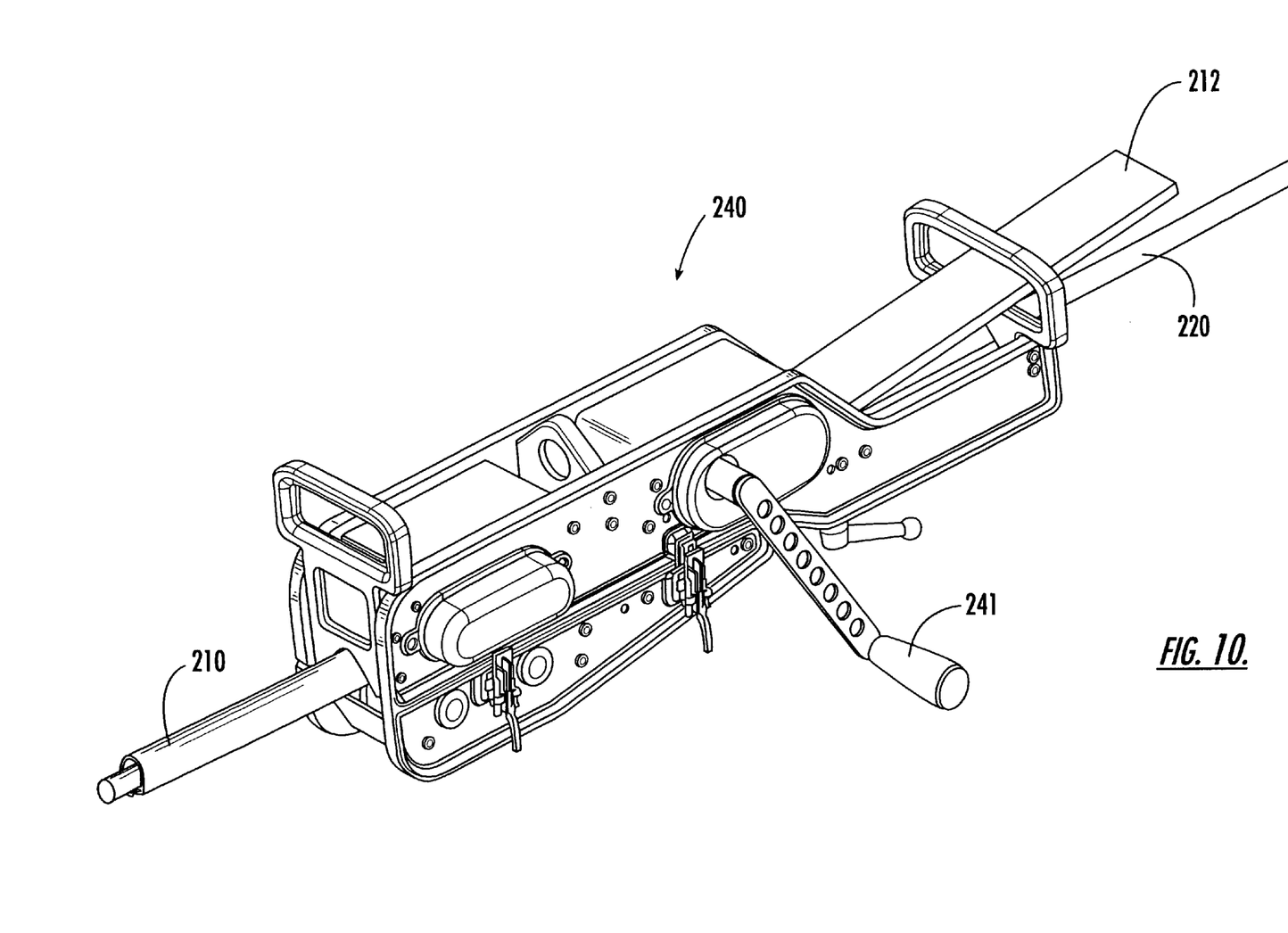
FIG. 10 is a perspective view of an apparatus containing a cover assembly housing and guide assembly for installing flashover protection covers around electric power lines according to another embodiment of the present invention.

A first drive roller 68 (FIG. 6) is rotationally mounted between the first pair of flanges 50a, 50b of the frame 46 via a first axle 69 that extends between the flanges 50a, 50b, as illustrated. The first drive roller 68 is rotated via an external drive mechanism 72 (FIG. 4), including, but not limited to, a pneumatic-powered drill, a hydraulic-powered drill, a gas-powered drill, or a battery powered drill, that is configured to rotate the drive shaft 73. The illustrated drive shaft 73 extends into a housing 75 that contains one or more gears necessary to translate the rotational motion of the drive shaft 73 into rotational motion of the first axle 69, as indicated by arrow 67 (FIG. 6). Alternatively, a hand crank 241, as illustrated in FIG. 10 below, may be utilized to rotate the first drive roller 68.

Devices for translating motion about a first axis into rotational motion about a second axis perpendicular to the first axis are well known in the art and need not be described further herein. Preferably, the drive shaft 73 extends downwardly away from the power line 30 when the cover installation apparatus 40 is in an installed position, as illustrated. This configuration of the drive shaft 73 helps keep the hands of a user, as well as devices for rotating the drive shaft 73, away from the power line 30. Alternatively, an internal drive mechanism, such as, but not limited to, a battery-powered motor, may be incorporated into the cover installation apparatus 40 for rotating the drive shaft 73.

A second drive roller 70 is rotationally mounted between the first pair of flanges 50a, 50b via a second axle 71 that extends between the first pair of flanges 50a, 50b, as illustrated in FIG. 6. In the illustrated embodiment, the first and second axles 69, 71 extend through the flange 50b into a drive housing 74 (FIG. 7) secured to the flange 50b. As illustrated in FIG. 6, a first pulley 76 is mounted onto the first axle 69 within the drive housing 74. A second pulley 78 is mounted onto the second axle 71 within the drive housing 74. An endless belt 80 cooperates with the first and second pulleys 76, 78 such that rotational motion of the first pulley 76 in the direction indicated by arrow 67 causes the second pulley 78 to rotate in the direction indicated by arrow 67'. Accordingly, rotational motion imparted upon the first drive roller 68 also causes the second drive roller 70 to rotate.

It is to be understood, however, that the present invention is not limited to the illustrated configuration of drive rollers. The first and second drive rollers 68, 70 may be independently driven or may be jointly driven in another manner, such as via a chain and sprockets. Operation of the first and second drive rollers 68, 70 for advancing the flexible panel 12 into the cover assembly housing 100 and for advancing the installed cover 10 along a power line span will be described in detail below.

A second pair of spaced-apart, longitudinally extending flanges 82a, 82b are pivotally connected to the first pair of flanges 50a, 50b via a hinge 84 (FIG. 7) which allows the second pair of flanges 82a, 82b to swing downwardly and away from the first pair of flanges 50a, 50b to facilitate installation of the cover installation apparatus 40 on a power line 30, as illustrated in FIG. 5. Once positioned on a power line 30, the second pair of flanges 82a, 82b are pivoted upwardly towards the first pair of flanges 50a, 50b and secured thereto via a latch 86 and latching mechanism 88. Preferably, the latching mechanism 88 is configured to allow remote operation by a user via a manipulator device, such as a hot stick. In the illustrated embodiment, the latching mechanism 88 is mounted to the flange 82a and includes a ring-shaped member 90 that is configured to receive an end of a hot stick or other manipulator device. It is understood that the first and second pairs of flanges 50a, 50b and 82a, 82b may be attached together in various ways, and that the present invention is not limited to the illustrated embodiment.

The cover assembly housing 100 includes upper and lower portions 102a, 102b secured between the first pair of flanges 50a, 50b and between the second pair of flanges 82a, 82b, respectively, as illustrated in FIG. 5. When assembled together (i.e., when the second pair of flanges 82a, 82b are secured to the first pair of flanges 50a, 50b via latch 86 and latching mechanism 88), the cover assembly housing 100 includes opposite first and second ends 104a, 104b. An inlet port 106 for receiving the flexible panel 12 is formed in the cover assembly housing first end 104a, and an outlet port 108, from which the assembled cover 10 exits the cover assembly housing 100, is formed in the cover assembly housing second end 104b. The inlet port 106 has a shape complimentary to the cross section of the flexible panel 12 in an uninstalled configuration (FIG. 3A). The outlet port 108 has a shape complimentary to a cross section of the flexible panel 12 in an installed configuration (FIG. 3C).

An interior passageway 110 (FIG. 6) extends along a longitudinal direction from the cover assembly housing inlet port 106 to the cover assembly housing outlet port 108, as illustrated. The passageway 110 is configured to receive a power line 30 therethrough. As illustrated in FIG. 5, when the cover installation apparatus 40 is undergoing installation on a power line 30, the second pair of flanges 82a, 82b are pivotally moved away from the first pair of flanges 50a, 50b. The cover assembly housing upper portion 102a can then be placed on top of a power line 30 such that the power line 30 extends through the portion of the passageway 110 formed in the cover assembly housing upper portion 102a. When the cover assembly housing lower portion 102b is joined with the cover assembly housing upper portion 102a, the power line 30 extends into the inlet port 106, through the passageway 110, and out through the outlet port 108, as illustrated in FIG. 6. Preferably, the cover assembly housing 100, through which the passageway 110 extends, is formed from material having good machinability and wear resistance. Exemplary materials include, but are not limited to, DELRIN® and TEFLON®.

The passageway 110 has a shape configured to join together the opposite edge portions 14a, 14b of the flexible panel 12 as the flexible panel 12 is advanced through the passageway 110 from the inlet port 106 to the outlet port 108. Accordingly, the flexible panel 12 is formed into a longitudinally extending cover 10 that surrounds the electrical power line 30. In the illustrated embodiment, the first drive roller 68 is located upstream from the inlet port 106 and serves as means for advancing the flexible panel 12 from a supply source through the passageway 110. As illustrated in FIG. 6, the first roller 68 is configured to frictionally engage the flexible panel 12 and advance the flexible panel 12 along the guide rail 56 into the inlet port 106.

Alternatively, in lieu of the illustrated passageway 110, a series of additional, spaced-apart rollers could be utilized for joining together the opposite edge portions 14a, 14b of the flexible panel 12 as the flexible panel 12 is advanced along a power line.

In the illustrated embodiment, the second drive roller 70 is located downstream from the outlet port 108 and serves as additional means for advancing the flexible panel 12 through the passageway 110 and for advancing an assembled cover 10 along a power line span. The illustrated second drive roller 70 is configured to frictionally engage the assembled cover 10 surrounding the power line 30 as the cover 10 exits from the outlet port 108 and advance the cover 10 along the stationary electrical power line 30.

In the illustrated embodiment, a third roller 112 is rotationally mounted between the second pair of flanges 82a, 82b via a third axle 113 that extends between the second pair of flanges 82a, 82b. The third roller 112 is located beneath the second drive roller 70 on the opposite side of the cover 10 exiting from the outlet port 108, as illustrated. The third roller 112 makes frictional contact with the cover 10 to help ensure that the ends 14a, 14b of the flexible panel 12 are properly joined together as the cover 10 exits from the outlet port 108. In the illustrated embodiment, the third roller 112 is not a driven roller (i.e., it is "free-wheeling"). However, the third roller 112 may be driven by a power source, either independently of the first and second drive rollers 68, 70, or in some combination therewith.

Preferably, the first and second drive rollers 68, 70 and the third roller 112 are formed from polymeric material, such as neoprene, that provides good frictional contact with the flexible panel 12 entering the inlet port 106 and the cover 10 exiting the outlet port 108.

In the illustrated embodiment, the cover installation apparatus 40 also includes an alignment drum 52 rotationally secured to the elongated member 48 upstream from the inlet port 106 via support members 54a, 54b. The guide rail 56 extends from the alignment drum 52 to the inlet port 106 to provide a path for the flexible panel 12 to follow. The guide rail 56 is configured to slidably receive the flexible panel 12 from the alignment drum 52 and to direct the flexible panel 12 into the inlet port 106.

As illustrated in FIG. 5, the guide rail 56 is configured such that the surface 12a of the flexible panel 12 that surrounds the power line 30 is in adjacent contacting relationship with the top surface 56a of the guide rail 56. The opposite edges 14a, 14b extend beyond the top surface 56a of the guide rail 56 as illustrated and help maintain the alignment of the flexible panel 12 on the guide rail 56.

The illustrated alignment drum 52 includes a pair of opposing flanges 53a, 53b and a drum 55 positioned therebetween, around which the flexible panel 12 is wound. The alignment drum 52 is configured to receive the flexible panel 12 from a supply source at an angle transverse to the longitudinal direction of the guide rail 56 (and passageway 110) and to direct the flexible panel 12 onto the guide rail 56. The flexible panel 12 may be provided from a supply source, such as a spool, located on the ground or elevated to a position adjacent the cover installation apparatus 40. In the illustrated embodiment, the flexible panel 12 follows the path indicated by arrow 114 and makes a loop around the drum 55, whereupon the flexible panel 12 is properly aligned for entering the cover assembly housing inlet port 106.

In the illustrated embodiment, a guide plate 57 is provided that facilitates aligning the flexible panel 12 with the guide rail 56 as the flexible panel 12 comes around the drum 55.

One end 57a of the guide plate 57 is configured to extend between the flexible panel opposite ends 14a, 14b and make contact with the surface 12a of the flexible panel 12 that will enclose the power line 30. An opposite end 57b of the guide plate 57 includes an aperture 57c formed therein that is configured to overlie the power line 30. The guide plate facilitates the proper alignment of the flexible panel 12 as it comes around the drum 55, no matter at what angle the flexible panel 12 approaches the alignment drum 52 from a supply source.

It is to be understood that the present invention is not limited to the illustrated alignment drum 55. Various devices or members having a curved surface may be utilized for receiving the flexible panel 12 from a supply source at an angle transverse to the longitudinal direction of the guide rail 56 (and passageway 110) and to direct the flexible panel 12 onto the guide rail 56.

The illustrated cover installation apparatus 40 also includes a cutting device 116 located upstream from the inlet port 106 of the cover assembly housing 100. The illustrated cutting device 116 includes a guide member 118 mounted to the frame 46. The guide member 118 has an aperture 120 formed therein through which the flexible panel 12 passes prior to reaching the first drive roller 68. An elongated blade 122 has one end 122a pivotally mounted to the frame 46 adjacent the guide member 118 and an opposite free end 122b configured for manipulation by a user. In the illustrated embodiment, the elongated blade free end 122b includes a ring 123 configured to receive the end of a manipulator device, such as a hot stick. Together, the guide member 118 and elongated blade 122 serve as means for cutting the flexible panel 12.

Figure 8:
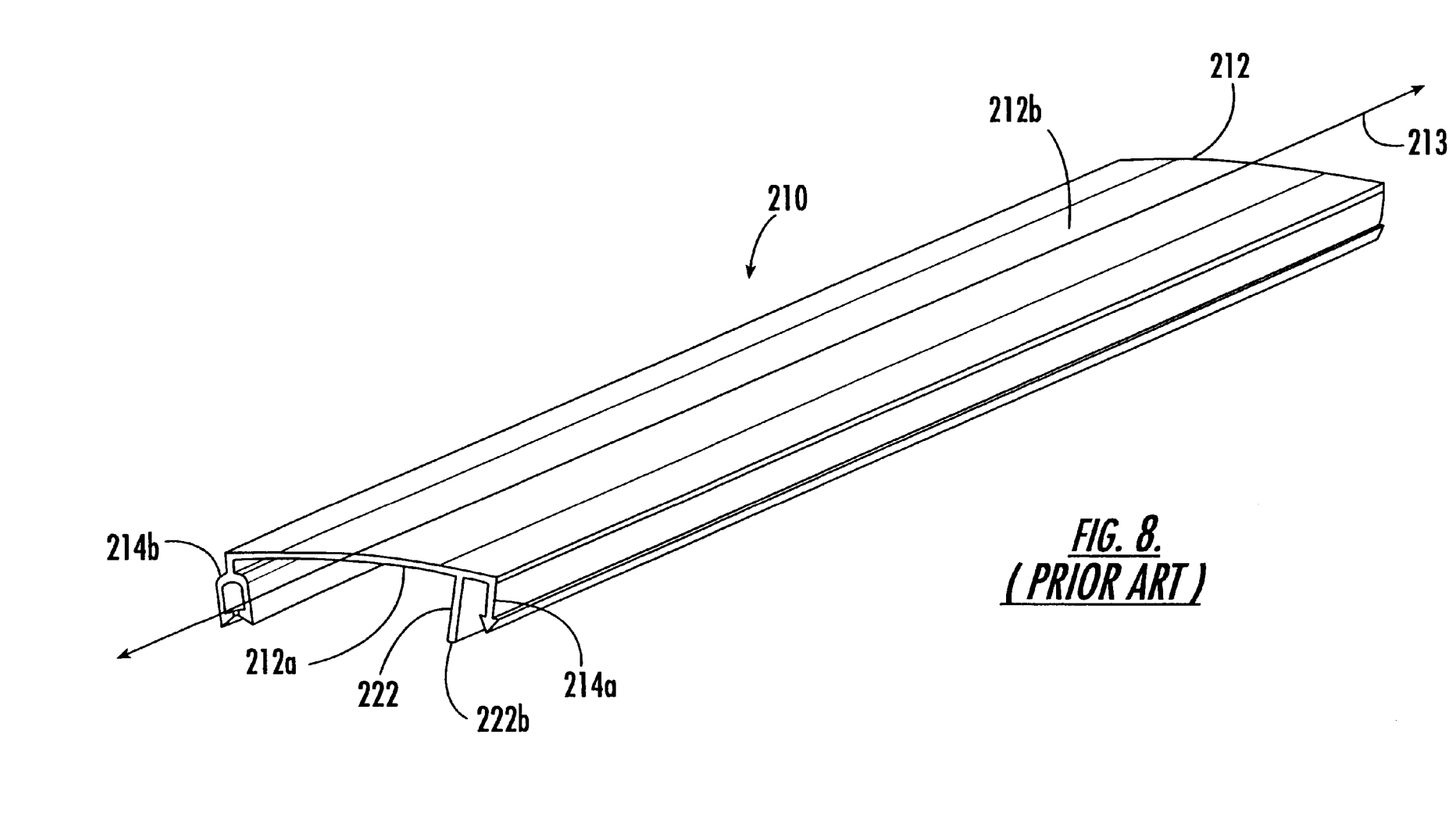
FIG. 8 is a perspective view of another exemplary flashover protection cover for an electrical power line, in an uninstalled configuration.
Figure 9:
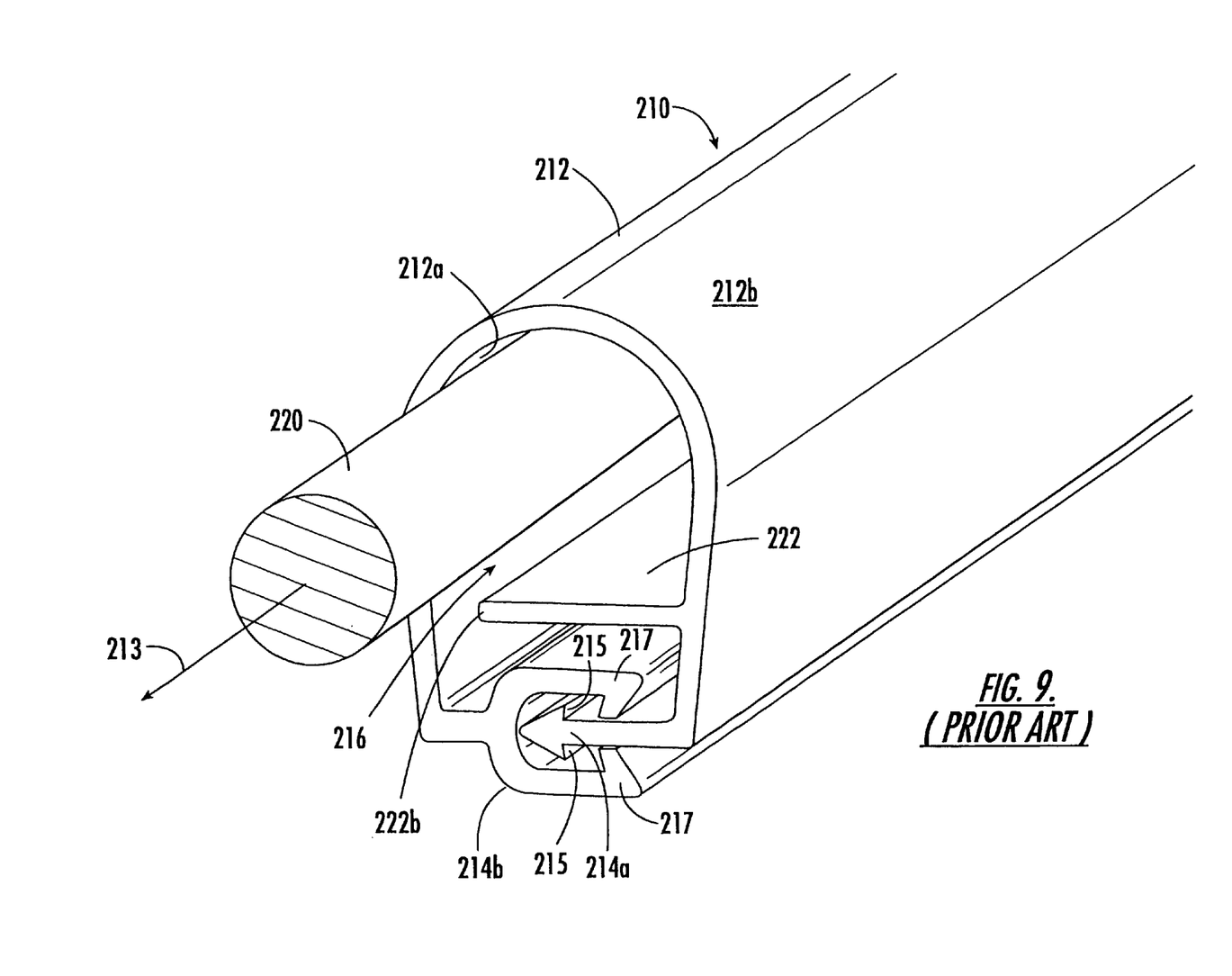
FIG. 9 is a perspective view of the flashover protection cover of FIG. 8 in an installed configuration surrounding an electrical power line.

Referring now to FIGS. 8–9, another exemplary flashover protection cover 210 for covering an energized conductor, or other structure, and that may be installed via a cover installation apparatus according to the present invention is illustrated in an uninstalled configuration (FIG. 8) and in an installed configuration (FIG. 9). The flashover protection cover 210 includes an elongated flexible panel 212 that defines a longitudinal direction (indicated by arrow 213). The flashover protection cover 210 has opposite first and second surfaces 212a, 212b, and generally parallel, opposite first and second edge portions 214a, 214b, as illustrated. The first and second edge portions 214a, 214b are configured to be joined together such that the first surface 212a forms a longitudinally extending chamber 216 (FIG. 9) configured to enclose an electrical conductor 220, or other structure, that extends along the longitudinal direction 213. The second surface 212b forms an outer surface of the flashover protection cover 210.

In the illustrated embodiment, edge portion 214b is configured to removably receive edge portion 214a therewithin. Edge portion 214a has an "arrowhead" configuration with shoulder portions 215 configured to be retained by elastic members 217 of edge portion 214b. The illustrated embodiment provides means for maintaining the panel edge portions 214a, 214b joined together under adverse conditions, while allowing the cover to be removed, if necessary, at a later time.

Still referring to FIGS. 8–9, a wall or creepage extender 222 is connected to the panel inner surface 212a adjacent the first edge portion 214a, as illustrated. The creepage extender 222 is preferably configured to be longitudinally coextensive with the chamber 216 when the panel edge portions 214a, 214b are joined together. The creepage extender 222 has a free edge portion 222b that is generally parallel with the first edge portion 214a, as illustrated. The creepage extender 222 is designed to retain any electrical flashover or arcing from the conductor 220 within the longitudinally extending chamber 216.

Figure 11:
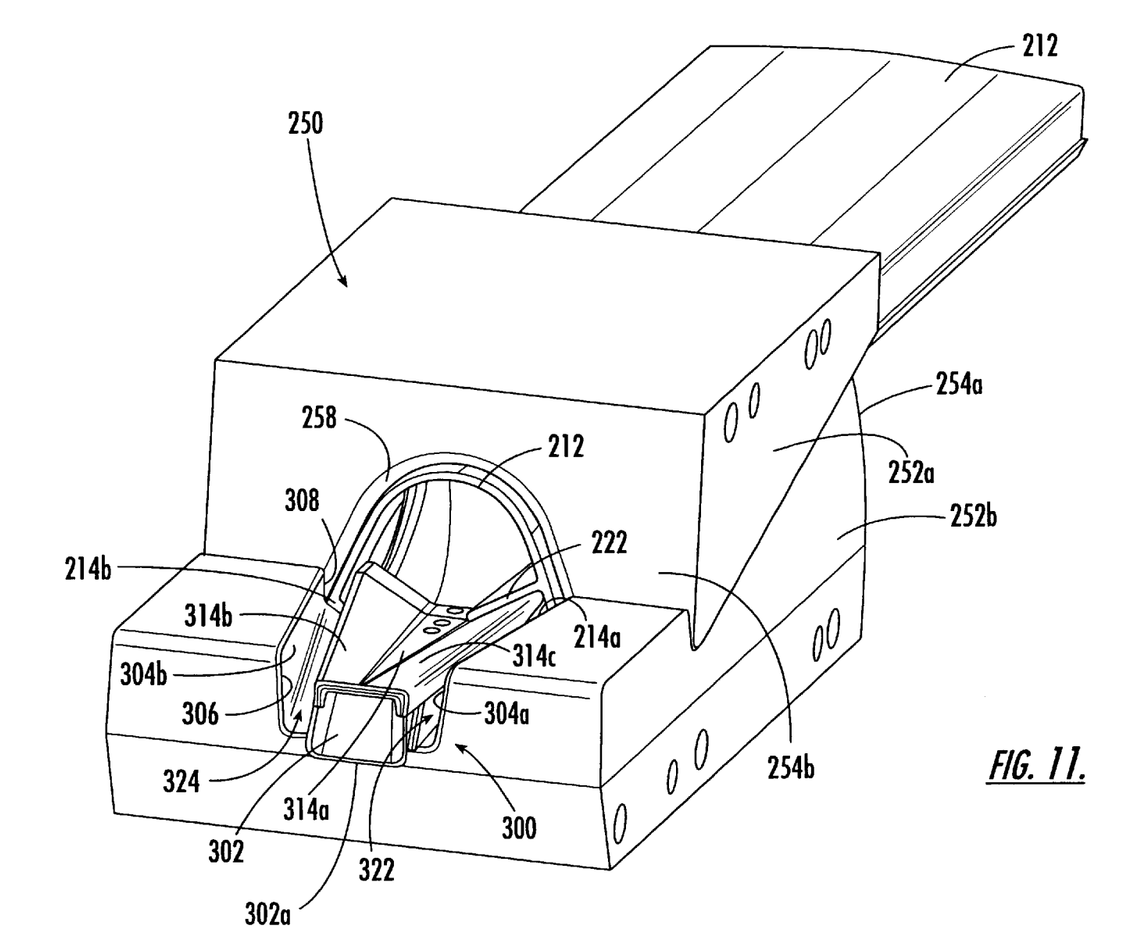
FIG. 11 is a perspective view of a cover assembly housing and guide assembly within the apparatus of FIG. 10 looking towards the cover assembly housing outlet.

Referring now to FIGS. 10–13, an apparatus 240 for installing a flashover protection cover 210 around an energized electrical conductor 220 (or other equipment or structure portion) according to another embodiment of the present invention is illustrated. The apparatus 240 is similar in configuration and operation to the apparatus 40 described above with respect to FIGS. 4–7 except that an alignment drum (52, FIG. 4) is not utilized and a guide assembly 300 is utilized, as described below. As illustrated in FIG. 11, the apparatus 240 includes a cover assembly housing 250 (illustrated separated from the apparatus 240 in FIG. 11) having upper and lower portions 252a, 252b.

The cover assembly housing 250 includes opposite first and second ends 254a, 254b. An inlet port 256 (see FIG. 12) for receiving a flexible panel 212 is formed in the cover assembly housing first end 254a, and an outlet port 258 (see FIG. 11), from which a partially assembled cover 210 exits the cover assembly housing 250, is formed in the cover assembly housing second end 254b. The inlet port 256 has a shape complimentary to the cross section of the flexible panel 212 in an uninstalled configuration (FIG. 8). The outlet port 258 has a shape complimentary to a cross section of the flexible panel 212 in a partially assembled installed configuration (FIG. 9).

The cover assembly housing 250 includes an interior passageway 260 (FIG. 12) like that described above with respect to the cover assembly housing 100 illustrated in FIG. 6. The interior passageway 260 extends along a longitudinal direction (shown by arrow 213) from the cover assembly housing inlet port 256 to the cover assembly housing outlet port 258, as illustrated. As described above with respect to FIGS. 4–7, the passageway 260 of the illustrated cover assembly housing 250 is configured to receive a power line 30 therethrough. The passageway 260 in conjunction with an elongated guide assembly 300 (described below) is configured to join together the opposite edge portions 214a, 214b of the flexible panel 212 as the flexible panel 212 is advanced through the passageway 260 from the cover assembly housing inlet port 256 to the cover assembly housing outlet port 258. Accordingly, the flexible panel 212 is formed into a longitudinally extending cover 210 that surrounds an electrical power line that extends through the passageway 260.

Figure 12:
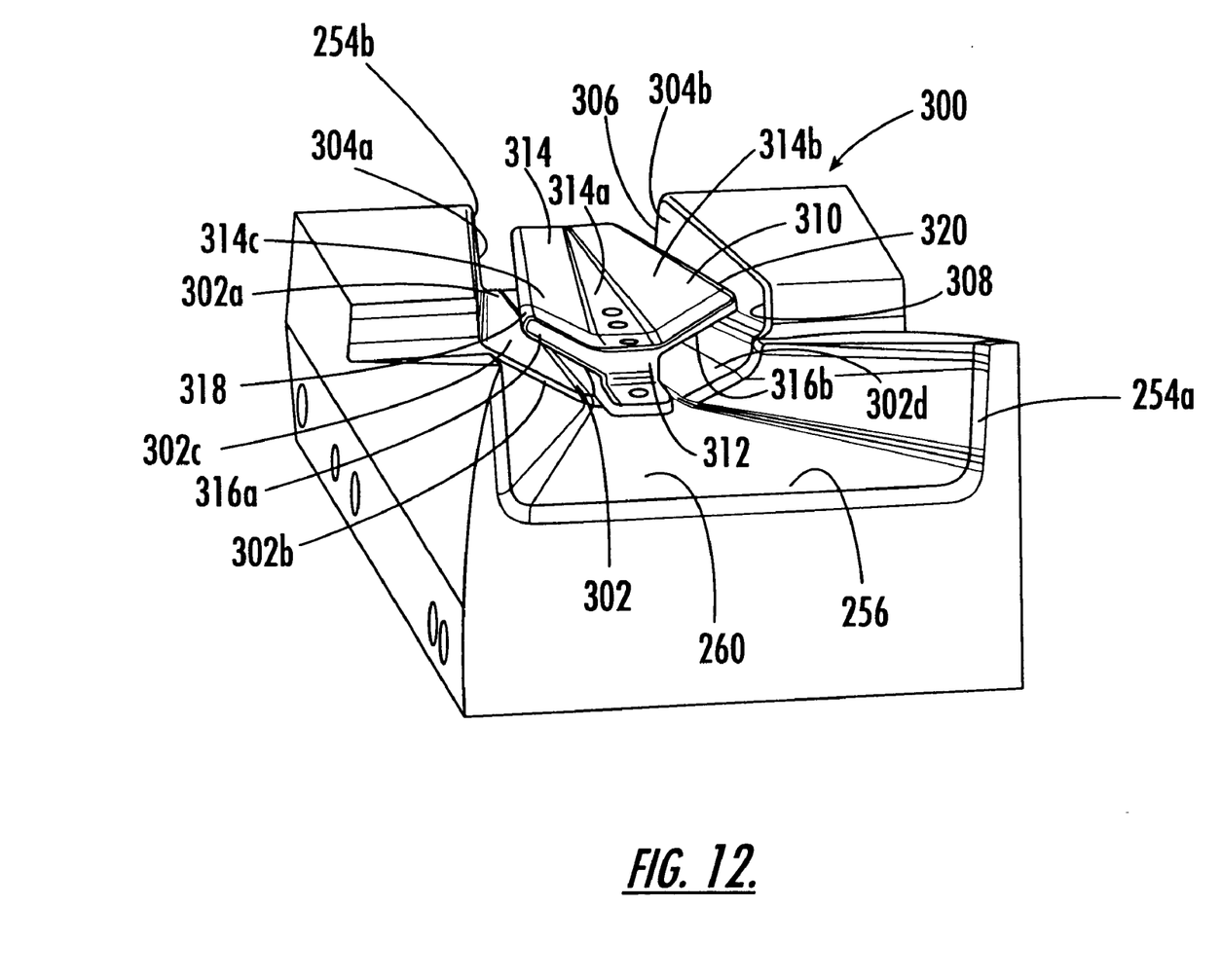
FIG. 12 is a perspective view of the cover assembly housing and guide assembly of FIG. 11 with the upper portion of the cover assembly housing removed and looking towards the cover assembly housing inlet.

An elongated guide assembly 300 is in communication with the passageway 260 adjacent the cover assembly housing outlet port 258, as illustrated (FIG. 12). The illustrated guide assembly 300 includes an elongated bottom wall 302 having opposite first and second ends 302a, 302b. A pair of spaced-apart, elongated side walls 304a, 304b extend upwardly from the bottom wall 302, as illustrated. The elongated side walls 304a, 304b converge towards the elongated bottom wall first end 302a to define a guide assembly outlet 306. The elongated side walls 304a, 304b diverge towards the elongated bottom wall second end 302b to define a guide assembly inlet 308.

The illustrated guide assembly 300 also includes a partition 310, the function of which is to help align the various portions of a flexible panel 212 passing through the guide assembly 300 during installation of a cover. As will be described below, the illustrated partition 310 helps align the first and second edge portions 214a, 214b of a flexible panel 212 for engagement. In addition, the partition 310 helps prevent the creepage extender 222 from becoming entangled with the second edge portion 214b during cover installation. Preferably, the bottom wall 302 and the side walls 304a, 304b of the guide assembly 300 are formed from non-conductive materials having good machinability and wear resistance. Exemplary materials include, but are not limited to, DELRIN® brand materials and TEFLON® brand materials. Preferably, the partition 310 is formed from brass. However, it is understood that the partition 310 may be formed from various types of materials and is not limited to brass.

The partition 310 includes a base member 312 that extends upwardly from the bottom wall 302 between the elongated side walls 304a, 304b, as illustrated. An elongated top portion 314 is transversely connected to the base member 312 so as to be maintained in spaced-apart relationship with the bottom wall 302. The top portion 314 and bottom wall 302 may be in parallel or non-parallel, spaced-apart relationship. The top portion 314 includes a medial upper surface 314a sandwiched between first and second tapered upper surfaces 314b, 314c, as illustrated. The top portion 314 also includes lower surfaces 316a, 316b and opposite elongated edges 318, 320.

The guide assembly 300 defines a pair of spaced-apart, converging passageways 322, 324 (FIG. 13) that are configured to slidably receive the flexible panel first and second edge portions 214a, 214b therethrough, respectively. The top portion lower surface 316a, a portion 302c of the bottom wall 302, and the side wall 304a define a first elongated passageway 322, as illustrated. The top portion lower surface 316b, a portion 302d of the bottom wall 302, and the side wall 304b define a second elongated passageway 324, as illustrated.

The top wall elongated edges 318, 320 are maintained in spaced-apart relationship with the respective converging side walls 304a, 304b to permit passage therebetween of a portion of a flexible panel. Preferably, each top portion elongated edge 318, 320 is in parallel spaced-apart relationship with a respective one of the converging side walls 304a, 304b.

Accordingly, as illustrated in FIG. 11, the first elongated passageway 322 is configured to slidably receive the flexible panel first edge portion 214a therethrough. The second elongated passageway 324 is configured to slidably receive the flexible panel second edge portion 214b therethrough. Preferably, the top wall upper surface 314c is configured to slidably receive the creepage extender 222 of the illustrated flexible panel 212 thereon. Thus, the guide assembly 300 is configured to join together the first and second edge portions 214a, 214b of the flexible panel 212 as the flexible panel 212 is advanced through the guide assembly 300 from the guide assembly inlet 308 to the guide assembly outlet 306.

As described above, drive rollers (not illustrated) may be provided upstream and downstream from the cover assembly housing inlet and outlet ports 256, 258, respectively, and serve as means for advancing the flexible panel 212 through the cover assembly housing 250. The drive rollers may be driven independently or together.

Figure 13:
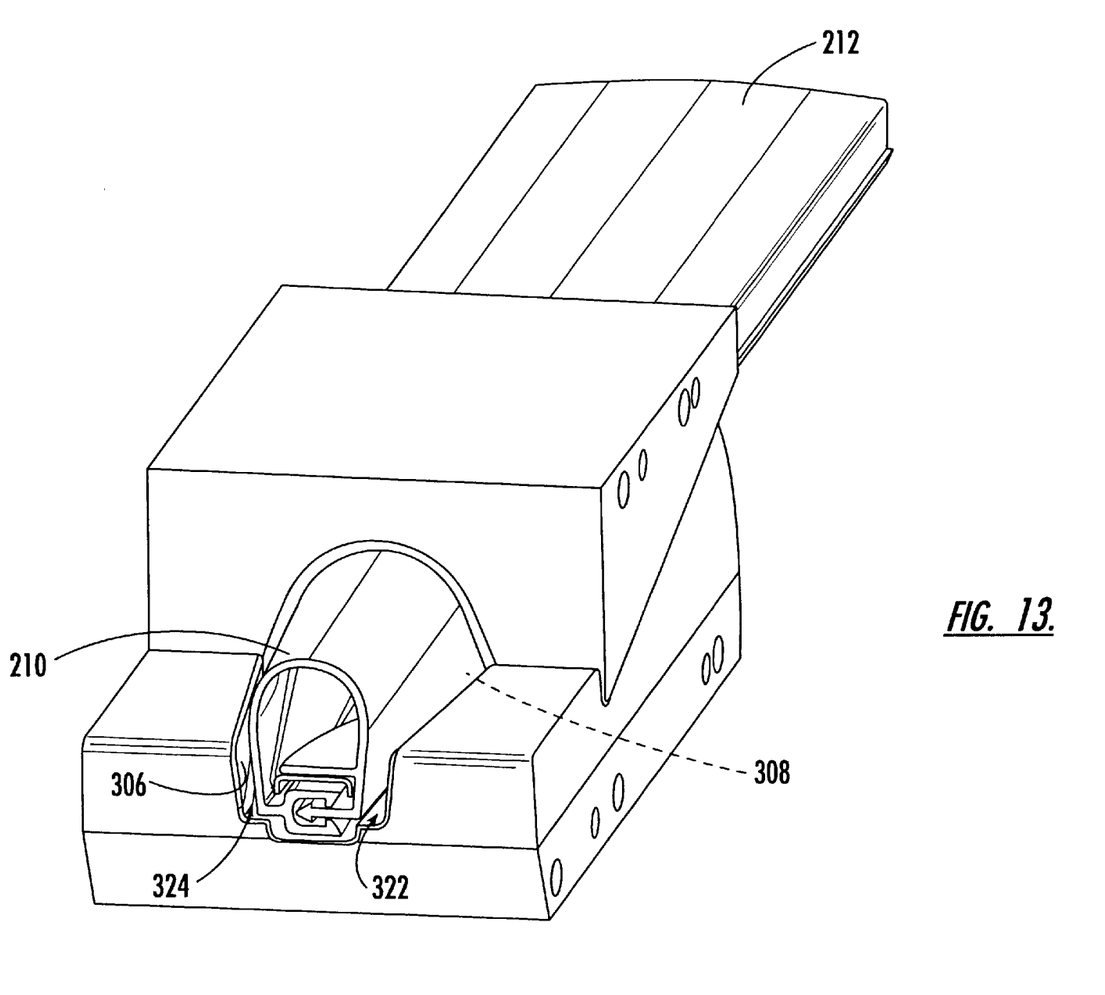
FIG. 13 is a perspective view of the cover assembly housing and guide assembly of FIG. 11 looking towards the cover assembly housing outlet and illustrating a cover extending from the cover assembly housing outlet.

FIG. 13 illustrates a flexible panel 212 entering the guide assembly inlet 308 and exiting via the guide assembly outlet 306 as an assembled cover 210. It is understood that the assembled cover would surround a power line. However, for clarity, a power line is omitted from FIG. 13. It is also understood that a guide assembly according to the present invention may have various configurations and shapes to accommodate flexible panels having different shapes and configurations.

Each cover installation apparatus 40, 240 according to the above embodiments of the present invention, may be designed for use with a particular size and style of flashover protection cover. Alternatively, separate cover assembly housings may be designed for use with a particular size and style of flashover protection cover and may be configured to be interchangeable with a cover installation apparatus 40, 240. In addition, adapters may be provided that, when positioned adjacent the cover assembly housing outlet port 108, allow flashover protection covers of different sizes and styles to be installed without requiring a different cover assembly housing.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for installing a cover around an electrical power line, wherein the cover includes an elongated flexible panel having generally parallel opposite first and second edge portions that are configured to be joined together, the apparatus comprising:
   a housing, comprising:
      opposite first and second ends;
      an inlet port in the first end;
      an outlet port in the second end;
      an interior passageway that extends along a longitudinal direction from the inlet port to the outlet port;
      wherein the passageway is configured to receive a power line that extends through the inlet and outlet ports of the housing; and
   an elongated guide assembly in communication with the passageway adjacent the outlet port, comprising:
      opposite third and fourth ends;
      a first elongated passageway configured to slidably receive the flexible panel first edge portion therethrough; and
      a second elongated passageway configured to slidably receive the flexible panel second edge portion therethrough, wherein the first and second elongated passageways converge towards the guide assembly fourth end;
      wherein the elongated guide assembly is configured to join together the first and second edge portions of the flexible panel as the flexible panel is advanced through the guide assembly from the guide assembly third end to the guide assembly fourth end such that the flexible panel forms a longitudinally extending cover that surrounds an electrical power line extending through the passageway.

2. The apparatus according to claim 1 wherein the elongated guide assembly comprises:

an elongated bottom wall having opposite first and second ends;

a pair of spaced-apart, elongated side walls that extend upwardly from the bottom wall, wherein the elongated side walls converge towards the elongated bottom wall first end to define a guide assembly outlet and wherein the elongated side walls diverge towards the elongated bottom wall second end to define a guide assembly inlet; and a partition extending upwardly from the bottom wall between the elongated side walls.

3. The apparatus according to claim 2 wherein the partition comprises:

a base member that extends upwardly from the bottom wall between the elongated side walls;

an elongated top portion transversely connected to the base member in spaced-apart relationship with the bottom wall, wherein the top portion comprises opposite upper and lower surfaces and opposite elongated edges, wherein each elongated edge is maintained in spaced apart relationship with a respective one of the pair of converging side walls to permit passage therebetween of a portion of the flexible panel adjacent a respective edge portion thereof, wherein a first portion of the top portion lower surface and a first portion of the bottom wall define the first elongated passageway, and wherein a second portion of the top portion lower surface adjacent the top wall lower surface first portion and a second portion of the bottom wall adjacent the bottom wall first portion define the second elongated passageway.

4. The apparatus according to claim 1, wherein at least a portion of each elongated edge in spaced apart relationship with a respective one of the converging side walls is in parallel spaced apart relationship with a portion of a respective one of the converging side walls.

5. The apparatus according to claim 1, further comprising means for advancing the flexible panel through the passageway.

6. The apparatus according to claim 1, wherein the inlet port has a shape complimentary to a cross section of the flexible panel in an uninstalled configuration, and wherein the outlet port has a shape complimentary to a cross section of the flexible panel in an installed configuration.

7. The apparatus according to claim 5, wherein the means for advancing the flexible panel through the passageway comprises:

a first roller rotationally mounted to the housing upstream from the inlet port, the first roller configured to frictionally engage the flexible panel and advance the flexible panel into the inlet port; and means for rotating the first roller.

8. The apparatus according to claim 7, wherein the means for advancing the flexible panel through the passageway further comprises:

a second roller rotationally mounted to the housing downstream from the outlet port, the second roller configured to frictionally engage the cover exiting from the outlet port and advance the cover along the electrical power line; and means for rotating the second roller.

9. An apparatus for installing a cover around an electrical power line, wherein the cover includes an elongated flexible panel having generally parallel opposite first and second edge portions that are configured to be joined together, the apparatus comprising:

a housing, comprising:
opposite first and second ends;
an inlet port in the first end;
an outlet port in the second end;
an interior passageway that extends along a longitudinal direction from the inlet port to the outlet port;
wherein the passageway is configured to receive a power line that extends through the inlet and outlet ports of the housing; and an elongated guide assembly in communication with the passageway adjacent the outlet port, comprising:

an elongated bottom wall having opposite third and fourth ends;

a pair of spaced-apart, elongated side walls that extend upwardly from the bottom wall, wherein the elongated side walls converge towards the elongated bottom wall third end to define a guide assembly outlet and wherein the elongated side walls diverge towards the elongated bottom wall fourth end to define a guide assembly inlet; and a partition, comprising:

a base member that extends upwardly from the bottom wall between the elongated side walls;

an elongated top portion transversely connected to the base member in spaced-apart relationship with the bottom wall, wherein the top portion comprises opposite upper and lower surfaces and opposite elongated edges, wherein each elongated edge is maintained in spaced apart relationship with a respective one of the pair of converging side walls to permit passage therebetween of a portion of the flexible panel adjacent a respective edge portion thereof, wherein a first portion of the top portion lower surface and a first portion of the bottom wall define a first elongated passageway configured to slidably receive the flexible panel first edge portion therethrough, and wherein a second portion of the top portion lower surface adjacent the top portion lower surface first portion and a second portion of the bottom wall adjacent the bottom wall first portion define a second elongated passageway configured to slidably receive the flexible panel second edge portion therethrough;

wherein the elongated guide assembly is configured to join together the first and second edge portions of the flexible panel as the flexible panel is advanced through the guide assembly from the guide assembly inlet to the guide assembly outlet; and a roller rotationally mounted to the housing downstream from the elongated guide assembly outlet, wherein the roller is configured to frictionally engage the cover and advance the cover along the electrical power line.

10. The apparatus according to claim 9 wherein at least a portion of each elongated edge in spaced apart relationship with a respective one of the converging side walls is in parallel spaced apart relationship with a portion of a respective one of the converging side walls.

11. The apparatus according to claim 9, wherein the inlet port has a shape complimentary to a cross section of the flexible panel in an uninstalled configuration, and wherein the outlet port has a shape complimentary to a cross section of the flexible panel in an installed configuration.

12. The apparatus according to claim 9, further comprising:

a second roller rotationally mounted to the housing upstream from the inlet port, the second roller configured to frictionally engage the flexible panel and advance the flexible panel into the inlet port.

* * * * *